United States Patent
Pan et al.

(10) Patent No.: US 11,391,859 B2
(45) Date of Patent: Jul. 19, 2022

(54) DETERMINING FORMATION PROPERTIES IN A GEOLOGICAL FORMATION USING AN INVERSION PROCESS ON A MODIFIED RESPONSE MATRIX ASSOCIATED WITH A DOWNHOLE TOOL

(71) Applicant: Halliburton Energy Services, Inc., Houston, TX (US)

(72) Inventors: Li Pan, Singapore (SG); Hsu-Hsiang Wu, Sugarland, TX (US); Weixin Dong, Sugarland, TX (US); YiJing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 16/344,305

(22) PCT Filed: Jun. 29, 2018

(86) PCT No.: PCT/US2018/040391
§ 371 (c)(1),
(2) Date: Apr. 23, 2019

(87) PCT Pub. No.: WO2020/005288
PCT Pub. Date: Jan. 2, 2020

(65) Prior Publication Data
US 2021/0041594 A1    Feb. 11, 2021

(51) Int. Cl.
*G01V 3/38* (2006.01)
*E21B 7/04* (2006.01)
(Continued)

(52) U.S. Cl.
CPC .............. *G01V 3/38* (2013.01); *E21B 7/04* (2013.01); *E21B 44/00* (2013.01); *E21B 49/00* (2013.01); *G01V 3/28* (2013.01)

(58) Field of Classification Search
None
See application file for complete search history.

(56) References Cited

U.S. PATENT DOCUMENTS

| 5,066,916 A | 11/1991 | Rau |
| 5,854,991 A | 12/1998 | Gupta et al. |
| (Continued) | | |

FOREIGN PATENT DOCUMENTS

| EP | 0560651 A2 | 9/1993 |
| GB | 2402489 A | 12/2004 |
| (Continued) | | |

OTHER PUBLICATIONS

PCT Application Serial No. PCT/US2018/040391, International Search Report, dated Feb. 22, 2019, 4 pages.
(Continued)

*Primary Examiner* — Lina M Cordero
(74) *Attorney, Agent, or Firm* — Delizio, Peacock, Lewin & Guerra

(57) ABSTRACT

A transmitter of a downhole tool inserted in a borehole of a geological formation transmits a first signal. A receiver of the downhole tool receives a second signal, where the second signal is induced by the first signal in the geological formation. A simple response matrix is determined based on the second signal, where the simple response matrix includes a plurality of response components. One or more of the response components are combined and a modified response matrix is formed by replacing one or more of the plurality of response components in the simple response matrix with a linear combination of the response components of the simple response matrix. The modified response matrix is inverted and an indication of formation properties in the geological formation is output.

20 Claims, 11 Drawing Sheets

(51) Int. Cl.
*E21B 44/00* (2006.01)
*E21B 49/00* (2006.01)
*G01V 3/28* (2006.01)

(56) References Cited

U.S. PATENT DOCUMENTS

| | | | |
|---|---|---|---|
| 6,643,589 B2 * | 11/2003 | Zhang | G01V 3/28 702/10 |
| 8,274,289 B2 | 9/2012 | Bittar et al. | |
| 9,091,791 B2 | 7/2015 | Rabinovich et al. | |
| 10,324,217 B2 * | 6/2019 | Hou | G01V 3/20 |
| 2012/0209528 A1 | 8/2012 | Itskovich | |
| 2015/0240629 A1 * | 8/2015 | Wu | G01V 3/28 702/11 |
| 2015/0260872 A1 * | 9/2015 | Hou | E21B 47/026 702/7 |
| 2015/0322774 A1 * | 11/2015 | Wu | G01B 5/004 702/7 |
| 2016/0002977 A1 | 1/2016 | Wu et al. | |
| 2016/0047934 A1 | 2/2016 | Wang et al. | |
| 2016/0108730 A1 | 4/2016 | Fanini et al. | |
| 2017/0075021 A1 | 3/2017 | Thiel et al. | |

FOREIGN PATENT DOCUMENTS

| | | |
|---|---|---|
| WO | 2017053072 A1 | 3/2017 |
| WO | 2018208282 A1 | 11/2018 |

OTHER PUBLICATIONS

PCT Application Serial No. PCT/US2018/040391, International Written Opinion, dated Feb. 22, 2019, 11 pages.

Abubakar, et al., "A Closed-Form Expression of the Electromagnetic Tensor Green's Functions for a Homogeneous TI-Anisotropic Medium", IEEE Geoscience and Remote Sensing Letters, vol. 3, No. 4, Oct. 2006, 5 pages.

Dupuis, et al., "Automatic Inversion of Deep-Directional-Resistivity Measurements for Well Placement and Reservoir Description", The Leading Edge, vol. 34 Issue 5, May 2015, 7 pages.

* cited by examiner

DETERMINING FORMATION PROPERTIES IN A GEOLOGICAL FORMATION USING AN INVERSION PROCESS ON A MODIFIED RESPONSE MATRIX ASSOCIATED WITH A DOWNHOLE TOOL

TECHNICAL FIELD

This disclosure generally relates to the field of earth or rock drilling (mining), and more particularly to determining formation properties of a geological formation by inverting a modified response matrix associated with a downhole tool.

BACKGROUND ART

A downhole tool positioned in a borehole of a geological formation has a transmitter and receiver. The transmitter transmits electromagnetic signals into the geological formation and the receiver receives electromagnetic signals from the geological formation indicative of a formation response. The formation response is processed to determine formation properties of the geological formation including resistivity, boundary position, formation dip angle, formation azimuth angle, anisotropy ratio, among others. The formation properties indicate whether the formation is capable of producing hydrocarbon. Depending on a drilling objective, the formation properties are used to geosteer a drill bit to either remain in a formation layer with certain formation properties or be directed to another formation layer with different formation properties to increase hydrocarbon production. The formation properties are used for other purposes as well.

BRIEF DESCRIPTION OF THE DRAWINGS

Embodiments of the disclosure may be better understood by referencing the accompanying drawings.

DESCRIPTION OF EMBODIMENTS

Figure 1:
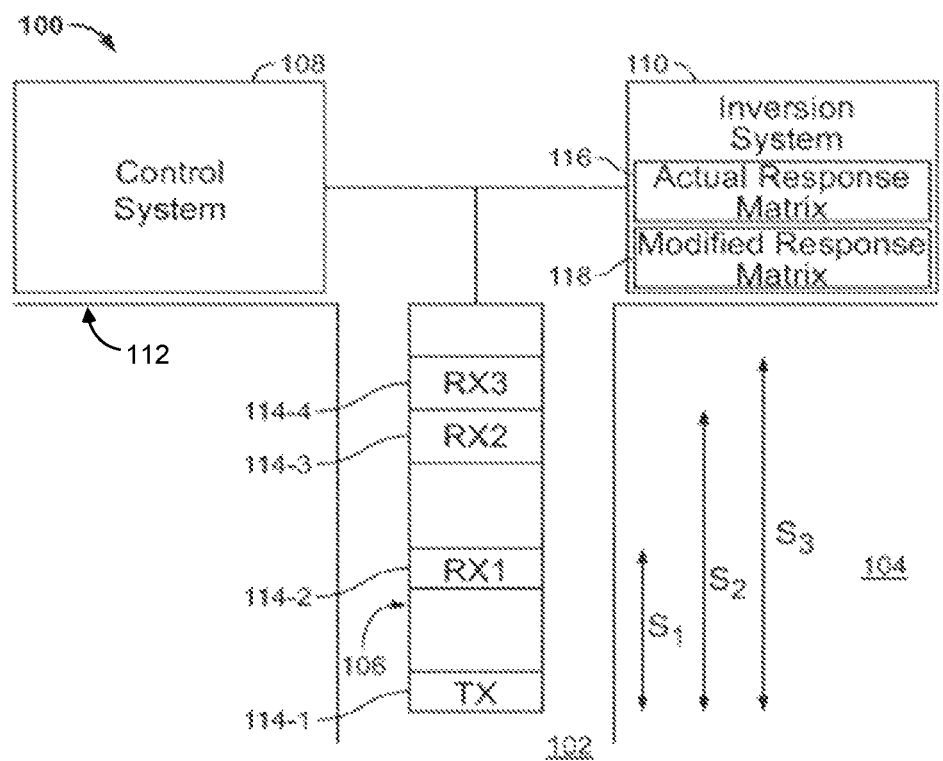
FIG. 1 shows a block diagram of an example tool to determine formation properties in a geological formation.

The description that follows includes example systems, methods, techniques, and program flows that embody embodiments of the disclosure. However, it is understood that this disclosure may be practiced without these specific details. For instance, this disclosure refers to determining formation properties in a geological formation based on an inversion scheme which uses a modified response matrix associated with a downhole tool such as an inductive logging tool which transmits and receives signals in multiple directions in illustrative examples. Embodiments of this disclosure can be applied in other contexts. In other instances, well-known instruction instances, protocols, structures and techniques are not shown in detail in order to not obfuscate the description.

Overview

A downhole tool has at least one transmitter and at least one receiver. The transmitter radiates an electromagnetic field in the geological formation and the receiver receives a signal indicative of formation properties in the formation. A simple response matrix is calculated based on the received signal. The transmitter and receiver each transmit and/or receive signals in one of three directions defined by a tool coordinate system. In this regard, the simple response matrix has nine components. Each component is indicative of a given response of the geological formation when a transmitter transmits signals in a given direction and a receiver receives signals in a given direction.

Various embodiments relate to an inversion process for determining formation properties of a geological formation based on a modified response matrix associated with a downhole tool such as a VDR tool positioned in a borehole of the geological formation. The modified response matrix is based on the simple response matrix. Certain components in the modified response matrix are set to corresponding components in the simple response matrix. Other components in the modified response matrix are not set to corresponding components in the simple response matrix, hence the term "modified response matrix". For example, some components in the modified response matrix are set to zero based on an assumption that the geological formation takes a form of vertically stacked formation layers, where formation properties are uniform in a plane parallel to layer boundaries and the formation properties are the same within a same layer. These components are set to zero because they cancel each other out in the vertically stacked formation layers. As another example, some components in the modified response matrix are set to a linear combination. The linear combination combines those components in the simple response matrix sensitive to formation properties deep in the formation with components of the simple response matrix which were not set to zero.

In general, the components of the modified response matrix are strong, have a high signal to noise ratio, and improved sensitivity to formation layer boundaries in the geological formation. The modified response matrix is input into an inversion process to determine formation properties in the geological formation within a half of a depth of investigation (DOI) or less. The inversion process determines the formation properties even in a thick formation layer and identifies formation layer boundaries without regular undulation which would otherwise be geologically unlikely. Additionally, misfit associated with the inversion process is low using the modified response matrix. The actual component matrix is also input into an inversion process. Unlike the modified response matrix, the actual component matrix is used to determine formation properties in the geological formation greater than half of the DOI. The formation properties associated with both ranges of DOI are combined to determine the formation properties at various depths in the geological formation. The formation properties are used to steer a drill bit in the geological formation to extract hydrocarbons, among other purposes.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example Systems

FIG. 1 shows apparatus 100 for determining formation properties downhole in borehole 102 of a geological formation 104. The apparatus 100 may include tool 106, control system 108, and an inversion system 110. Components of apparatus 100 can be structured for an implementation in the borehole 102 of a well as a measurement-while-drilling (MWD) system such as a logging-while-drilling (LWD) system. The tool 106 can be located in a bottom hole assembly (BHA). Alternatively, components of apparatus 100 may be configured in a wireline tool configuration. Inversion system 110 and control system 108 may be both located downhole, both located on a surface 112 (as shown), or one located downhole and the other located on the surface 112.

The tool 106 can have an arrangement of transmitters and/or receivers 114-1, 114-2 . . . 114-(N-1), 114-N structured relative to a longitudinal axis of tool 106. In some cases, the tool 106 may take the form of an inductive logging tool or specifically a very deep resistivity (VDR) tool. The transmitter can be operated to transmit signals and the receivers can be operated to receive signals. The signals may be transmitted near the tool 106, in regions behind tool 106, regions adjacent to the sides of tool 106, in regions in front of tool 106, and/or in regions behind the tool 106. A distance $S_{1\ldots n}$ between a given transmitter and a given receiver of the tool 106 may vary. The distance may be as little as 50 cm to much as 20 meters, among other distances. The tool 106 may take the form of a very deep resistivity (VDR) tool among other tools.

The control system 108 may control activation of the transmitters of tool 106 and reception of signals at the receivers of the tool 106 via a wired or wireless connection. The control system 108 may include a processor and a non-transitory machine-readable medium (e.g., ROM, EPROM, EEPROM, flash memory, RAM, a hard drive, a solid-state disk, an optical disk, or a combination thereof) capable of executing instructions. Software governs the operation of the control system 108. In one example, the control system 108 may be operable to activate a single transmitter to transmit a signal and activate a single receiver to receive the signal. In another example, control system 108 may be structured to be operable to activate a single transmitter to transmit a signal and activate a plurality of receivers to receive the signal. Further, the control system 108 may select to activate different pairs of transmitter and receivers in sequence. For example, the control system 108 may activate a total of four different transmitter/receiver pairs. The transmitter and receiver pairs may be activated in sequence such that only one pair is active at a time. In yet another example, a plurality of transmitter/receiver pairs may be activated at a time. Each transmitter may transmit signals at a given frequency and a receiver may be arranged to receive the transmitted signal at the given frequency, where the given frequency of a transmitter and receiver pair do not overlap.

The tool 106 may be a multicomponent tool. By multicomponent, a transmitter may be arranged to transmit signals in one or more directions and a receiver may be arranged to receive signals in more of more directions. The direction which the transmitter transmits signals and the receiver receives signals may be defined by a tool coordinate system, among other coordinate systems. In the tool coordinate system, an origin is located at a center of the transmitter, a z direction aligns with a direction from the center of the transmitter to a center of a receiver in a longitudinal direction of the tool, an x direction is perpendicular to the z direction and parallel to a formation layer boundary, and a y direction is perpendicular to both an x and z direction. The receiver may receive signals in the x, y, and/or z direction, and the transmitter may transmit signals in the x, y, and/or z direction.

Figure 2:
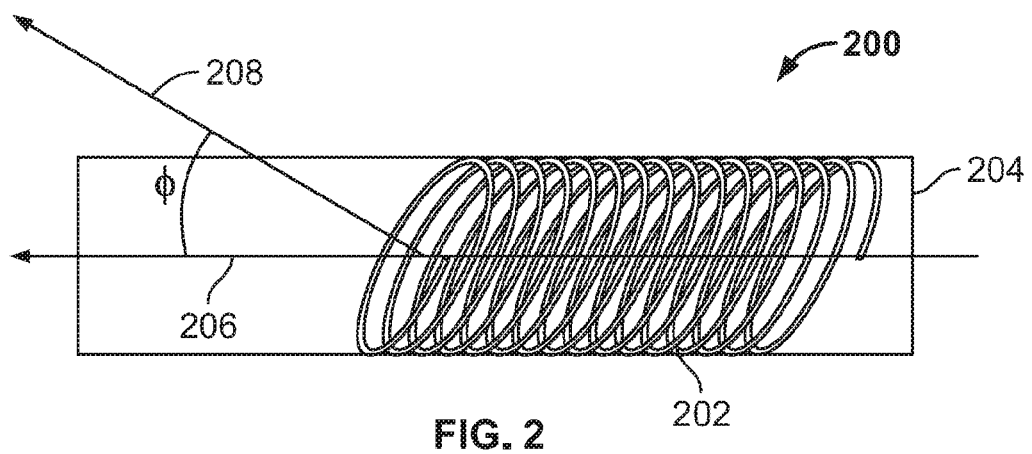
FIG. 2 shows an example arrangement of the example tool.

FIG. 2 show an example arrangement of the transmitter and/or receiver in a tool 200 that facilitates transmitting or receiving signals. The transmitter and/or receiver may be a coil 202 formed around a core 204. The coil 202 may be a conductive wire such as copper or aluminum and the core 204 may take the form of a magnetic core or non-magnetic core. The coil 202 may be wrapped around the core 204 with a plurality of turns to improve a signal to noise ratio of the transmitted or received signal.

In the case of a transmitter, an electrical current may be applied to a coil which causes the transmitter to transmit a signal. The signal takes the form of an electromagnetic field induced by the electrical current, and a strength of the transmitted signal is a function of the electrical current applied to and a number of turns of the transmitter coil 202. In the case of a receiver, a voltage may be induced in the coil based on presence of an electromagnetic field in the geological formation to cause the receiver to receive a signal.

The tool may be arranged to rotate in the borehole. Further, the coil associated with a transmitter and/or receiver may be oriented so that it is tilted. The tilt may be represented as an angle ⊖ between an axial direction 206 of the tool 200 and a perpendicular direction 208 to a plane of the coil 202. The tilt results in the transmitter transmitting a signal and/or receiver receiving a signal in one or more directions as the tool rotates. Alternatively, the transmitter and/or receiver may have one or more coils oriented in one or more directions which causes the transmitter to transmit a signal and/or the receiver to receive a signal in different directions. The directions may correspond to the x, y, and z directions of the tool coordinate system. In some examples, the signal transmitted and/or or received may be one or more signals, where each signal corresponds to a signal transmitted or a signal received in a given direction.

The transmitter may be oriented in a given direction when it transmits a signal and the receiver may be oriented in a given direction when it receives a signal. The signal received by the receiver may be represented as a response matrix:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

where $V_{ij}$ represents a response of the receiver. The response may be a magnitude (or indication of magnitude) of a signal received by the receiver. The subscripts "ij" denote that the receiver is oriented in a direction "j" when it receives a signal as a result of a transmitter oriented in a direction "i" transmitting a signal into the geological formation. For example, $V_{xy}$ means the receiver is oriented in a y direction of the tool coordinate system when it receives a signal as a result of the transmitter oriented in an x direction of the tool coordinate system transmitting a signal into the geological formation. An expression for electromagnetic field strength such as tensor Green functions may be used to determine elements of the response matrix based on the transmitted and received signal.

The response matrix may take other forms as well. The response matrix may have a smaller or larger dimension depending on a number of directions that the transmitter transmits signals and the receiver receives signals.

The tool 106 may output the response matrix, also referred to herein as a simple response matrix, to the inversion system 110 via a wired or wireless connection. The inversion system 110 may include a processor and a non-transitory machine-readable medium (e.g., ROM, EPROM, EEPROM, flash memory, RAM, a hard drive, a solid-state disk, an optical disk, or a combination thereof) capable of executing instructions. Software governs the operation of the inversion system 110. The inversion system 110 may store the simple response matrix in memory 116. Additionally, the inversion system 110 may store a modified response matrix in memory 118. The memory 116 and 118 may be a same memory location or different memory locations. The modified response matrix may be a modification of response components of the simple response matrix as described in further detail below. The inversion system 110 applies an inversion process using the modified response matrix to determine formation properties in the formation. The modified response matrix improves determination of the formation properties in the formation, including resistivity, boundary position, formation dip angle, formation azimuth angle, anisotropy ratio, among other properties determined via the inversion process.

Figure 3:
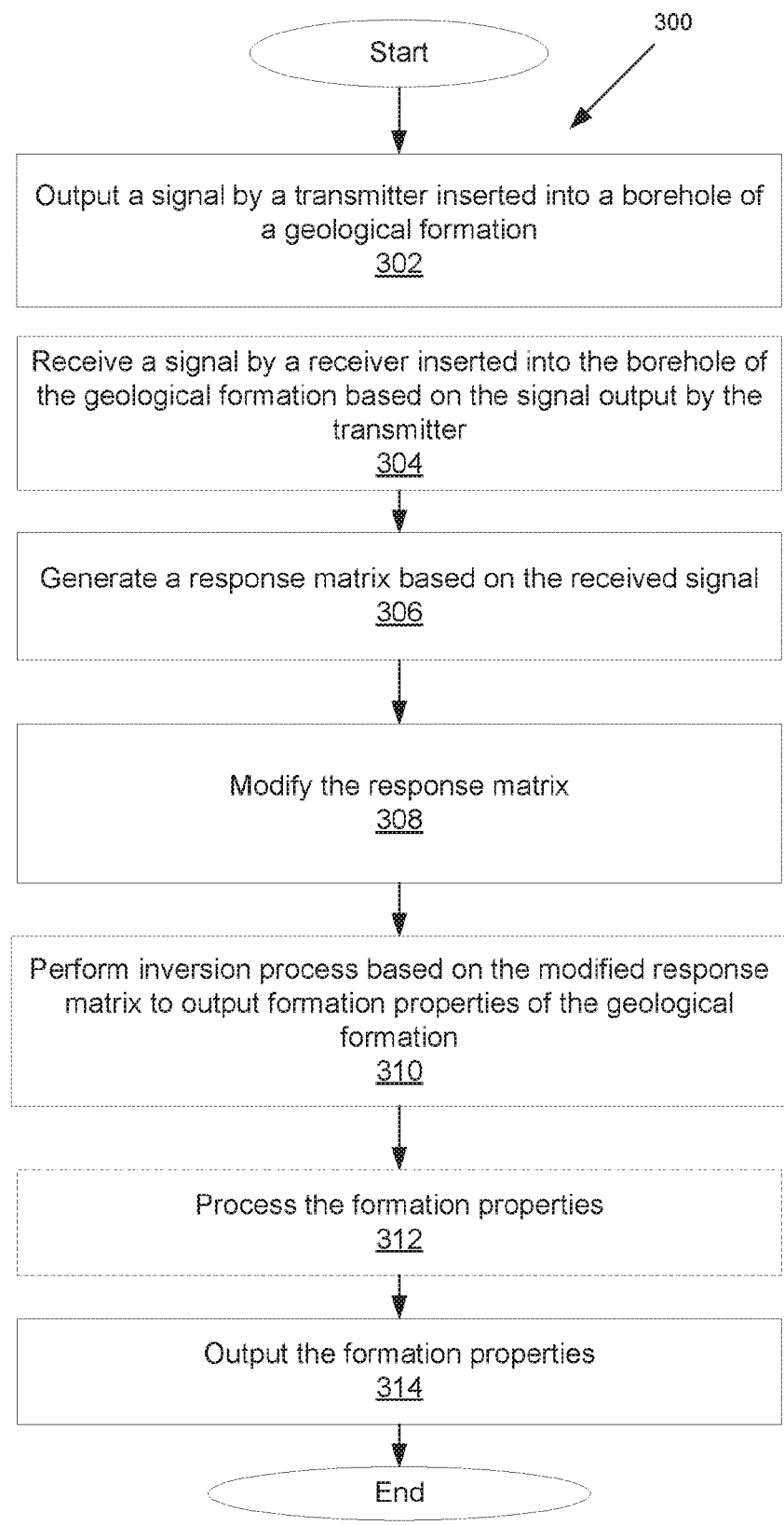
FIG. 3 shows an example process for determining formation properties in the geological formation.

FIG. 3 shows an example flow chart 300 for determining formation properties in a formation. The flow chart 300 may be executed by the structure described with respect to FIGS. 1-2 including one or more of the control system, inversion system, and downhole tool. Briefly, at 302, a signal is transmitted by a transmitter inserted into a borehole of a geological formation. At 304, a signal is received by a receiver inserted into the borehole of the geological formation. At 306, a response matrix is generated based on the received signal. At 308, the response matrix is modified. A 310, an inversion process is performed based on the modified response matrix to output formation properties of the geological formation. At 312, the formation properties are processed. At 314, the formation properties are output.

Referring back, at 302, a signal may be output by a transmitter of a downhole tool inserted in a borehole of a geological formation. The signal may be output as a result of applying an input signal to a transmitter of the downhole tool which causes the transmitter to radiate the output signal into the formation.

At 304, a signal may be received by a receiver of the downhole tool inserted in the borehole of the geological formation based on the signal output by the transmitter. The output signal by the transmitter may be an electromagnetic field. The electromagnetic field, referred to as a primary electromagnetic field, may cause eddy currents in the formation to flow inducing a time varying secondary electromagnetic field in the formation. The receiver may receive the primary and secondary electromagnetic field which in turn induces a voltage in the coil of the receiver, received signal. The received signal may be indicative of formation properties in the formation.

Further, the receiver may be separated by the transmitter by a given distance. The given distance may be based on a desired depth for which formation properties within the formation is to be determined. For example, the received signal may be indicative of formation properties for regions near the tool at a higher resolution when the transmitter and receiver is close together, e.g., shallow measurements from about one inch to about 20 ft. As another example, the received signal may be indicative of formation properties for regions further away from the tool at a lower resolution when the transmitter and receiver are further apart, e.g., deep measurements from about 5 feet to about 200 ft. Other variations are also possible.

At 308, a response matrix may be generated based on the received signal. The response matrix may include a plurality of response components. Each response component may indicate a response of a receiver oriented in a given direction when a transmitter transmits a signal in a given direction. The response matrix may be generated by the tool or some other apparatus and also referred to herein as the simple response matrix.

At 308, the response matrix is modified to facilitate a subsequent inversion process to determine the formation properties of the geological formation. An assumption is made that the geological formation takes the form of formation layers where each layered boundary is vertically arranged parallel to each other, e.g., the geological formation is represented as a uniaxial vertical 1-D model. This assumption may form a basis for modifying cross components Vxy, Vyx, Vyz, and Vzy of the response matrix.

Figure 4:
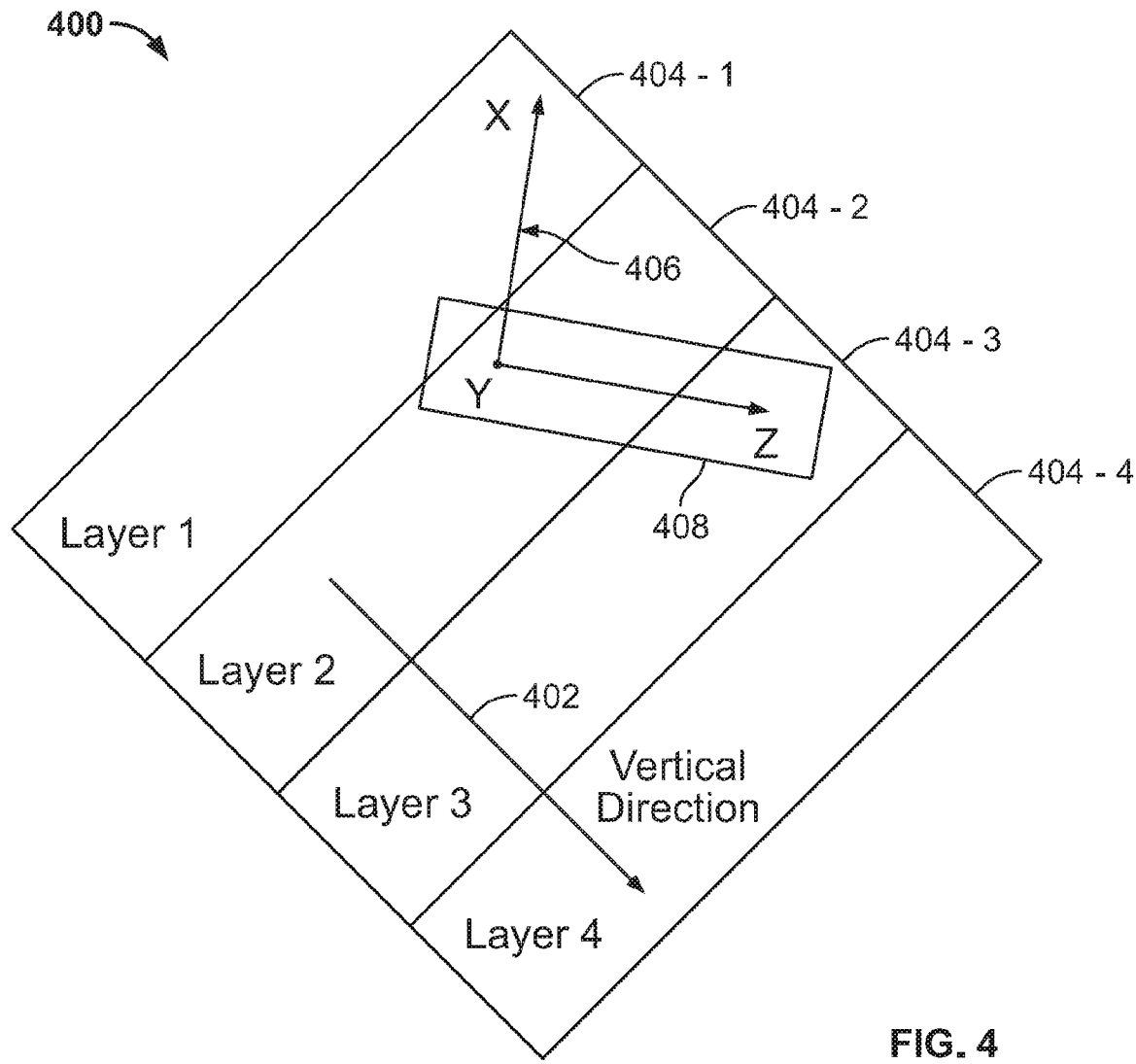
FIG. 4 shows an example of a uniaxial vertical 1-D model of a geological formation.

FIG. 4 shows an example 400 of this uniaxial vertical 1-D model. A vertical direction 402 may be defined as perpendicular to example layers 404-1 to 404-4. The uniaxial vertical 1-D model may indicate that formation properties (e.g., resistivity) are uniform in a plane parallel to layer boundaries (hence "uniaxial") and the formation properties are the same within a same layer (hence "vertical 1-D"). A tool coordinate system 406 may be defined with multiple axes in an x, y, and z direction. The x direction may be perpendicular to the z direction and lie in a plane spanned by the vertical direction 402 and a z direction. The z direction may be an axial direction of a tool 408. The y direction may be perpendicular to the x and z directions. Based on this assumption, electromagnetic physics principles such as defined by Maxwell equations, and x, y, and z directions defined by the tool coordinate system 406, cross components associated with Vxy, Vyx, Vyz, and Vzy of a response matrix may be set to zero because these components cancel each other out in the uniaxial vertical 1-D model of the geological formation (In cases other than a uniaxial vertical 1-D model, the cross components may be set to other fixed values). The components Vxx, Vyy, Vzz, Vxz, Vzx may not be canceled out. In this regard, the modified response matrix has five non-zero components:

$$\begin{bmatrix} V_{xx} & 0 & V_{xz} \\ 0 & V_{yy} & 0 \\ V_{zx} & 0 & V_{zz} \end{bmatrix}$$

The response matrix is further modified by modifying cross components Vxz and Vzx in the response matrix. The cross components Vzx and Vxz associated with the simple response matrix may be sensitive to formation properties deep in the formation with respect to the tool, but weak and typically corrupted by noise. The cross components may be weakest when the tool moves to near a center of a formation layer. This weakness results in an insensitivity to formation boundaries which may show up as undulations in a representation of formation properties near formation boundaries and errors in the inversion process. To address these deficiencies, a linear combination of the cross components Vxz and Vzx in the response matrix, i.e., simple response matrix, is formed with the one or more components associated with the transmitter and receiver both oriented in a z or x direction. The linear combinations are then used to modify the response matrix. An example of the components in the modified response matrix is shown below:

| Simple Response Matrix Components | Modified Response Matrix Components |
|---|---|
| Vxx | Vxx |
| Vyy | Vyy |
| Vzz | Vzz |
| Vxz | −Vxx −Vxz +Vzx +Vzz |
| Vzx | −Vxx +Vxz −Vzx +Vzz |

Figure 5:
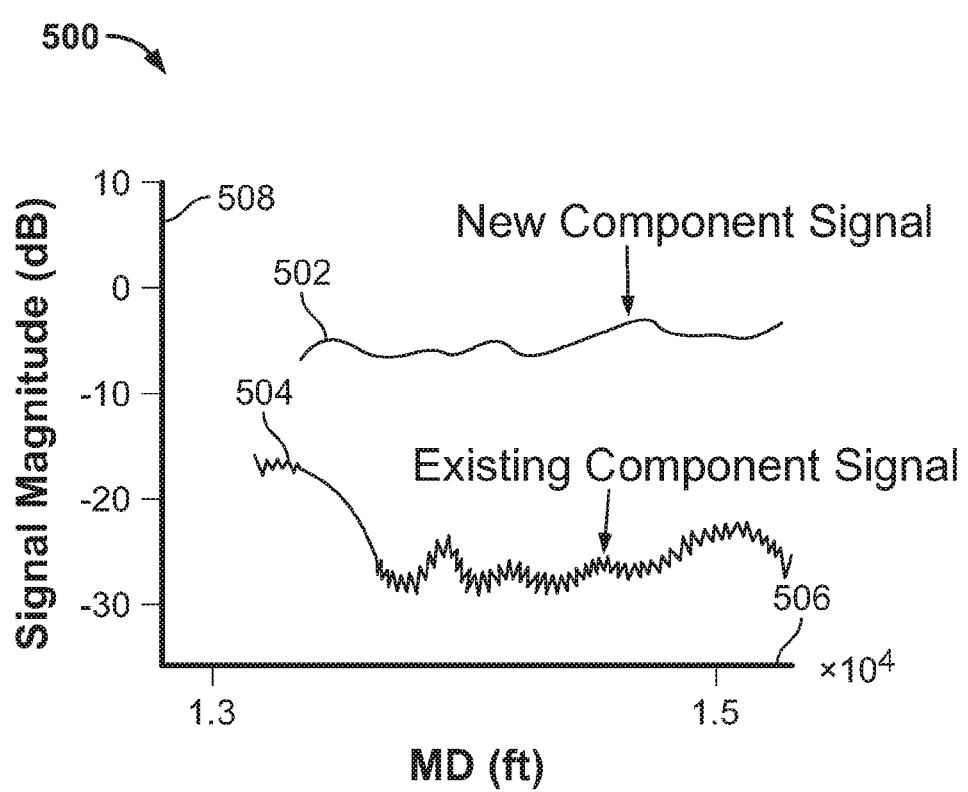
FIG. 5 illustrates a comparison of signals associated with a modified response matrix and simple response matrix.

FIG. 5 illustrates a comparison 500 between a cross component response 502 such as Vzx associated with the modified response matrix and a corresponding cross component response 504 associated with the simple response matrix. The comparison is shown a function of signal magnitude (dB) on a vertical axis 508 and measured depth (MD) (ft) on a horizontal axis 506. The cross-component response 504 such as Vzx associated with the simple response matrix may have a lower signal magnitude and more noise (shown by the signal variation) than the corresponding cross component response 502 associated with the modified response matrix (shown as a smooth signal). The modified Vxz and Vzx cross components provide several advantages, including a strong signal, high signal to noise ratio, and sensitivity to formation boundary position which facilitates accurate determination of formation properties in the inversion process.

At 310, an inversion is performed based on the modified response matrix to output formation properties of the geological formation. The inversion process may iteratively take as input the modified response matrix and output the formation properties of the formation based on a model of the formation. Each iteration of the inversion may attempt to reduce a difference between a simulated response matrix output by the model of the formation based on a guess of formation properties of the formation and the generated response matrix associated with the signal received by the receiver until the guess is deemed acceptable.

Figure 6:
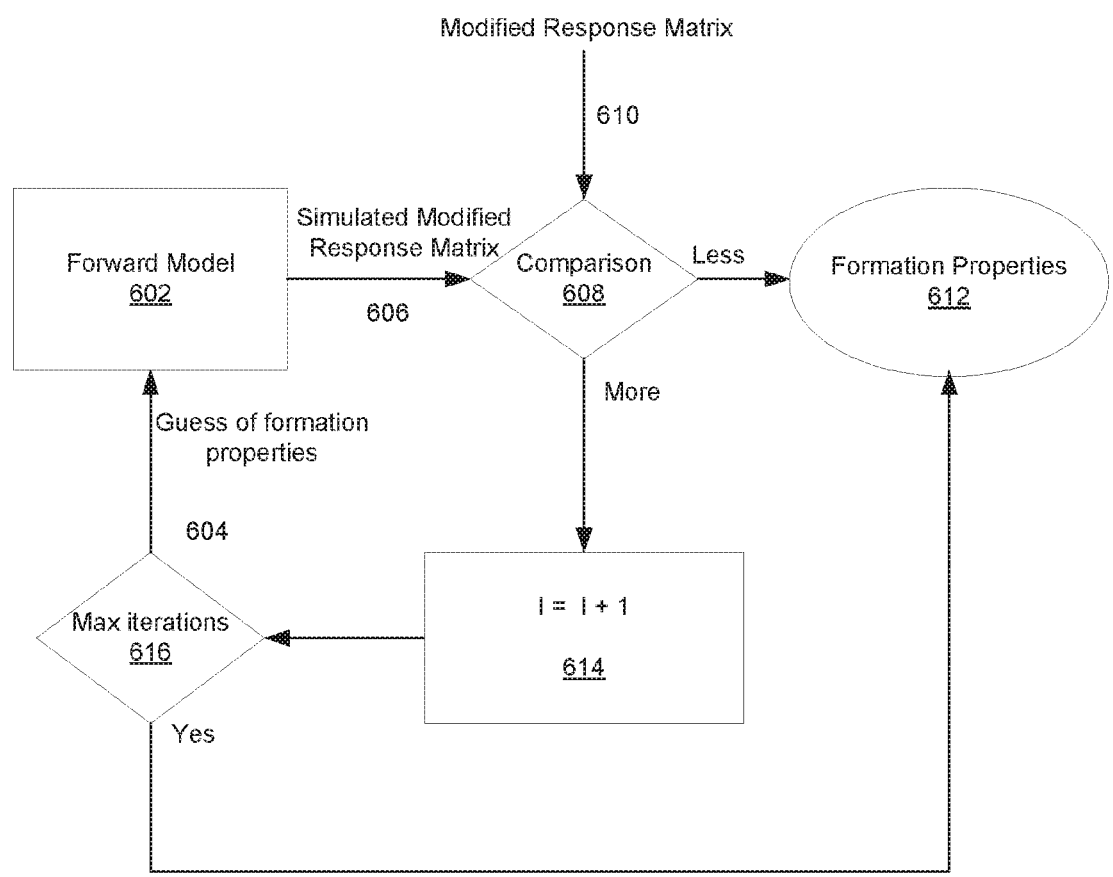
FIG. 6 shows an inversion process.

FIG. 6 illustrates this inversion process 600 in more detail. The inversion process 602 begins with inputting a guess 604 of formation properties at various positions in a geological formation into a forward model 602. The forward model models the geological formation and is constructed by analysis of many geological formations with many properties. The forward model 602 outputs a simulated modified response matrix 606 corresponding to the guess. The simulated modified response matrix 606 may be a simulation of a response matrix associated the geological formation when the geological formation has the guessed formation properties and where entries of the response matrix are modified as described above. At 608, the modified response matrix 610 received as an input into the inversion process 600 and the simulated modified response matrix 606 are compared. For example, the comparison may be a norm between entries of the modified response matrix 610 and the simulated modified response matrix 606. The norm may be indicative of a misfit between the modified response matrix and the simulated response matrix. If the norm is lower than a predetermined threshold, then the inversion process 600 may stop and formation properties associated with the guess may be deemed to be accurate approximations of the formation properties at 612. The formation properties may include one or more of a resistivity of the formation (e.g., represented with a horizontal and/or vertical component), formation boundary position, formation dip angle, formation azimuth angle, anisotropy ratio, among other properties.

If the difference is not lower than the predetermined threshold, then an iteration number is increased, at 614. To prevent, for example, infinite simulations for cases where no solution below the predetermined threshold is possible such as in highly noisy environments, the number of iterations may be compared with a previously set maximum iteration number, at 616. If the maximum number of iterations is reached, the processing may stop with the latest guess, or a previous guess of formation properties that minimized a misfit at 612. Otherwise, the formation properties associated with the guess are updated, at 604, a simulated modified response matrix is determined based on the guess in accordance with the forward model 602, and the above process of comparing the simulated modified response matrix with the modified response matrix is repeated.

The formation properties may include resistivity, boundary position, formation dip angle, formation azimuth angle, anisotropy ratio, among others. Referring back to FIG. 3, optionally at 312, the formation properties can be further processed. The optional nature of this step is shown by the dotted lines. The processing may take various forms. For example, noise in the formation properties may be removed through smoothing operations. As another example, a representation of the formation properties may be converted into a pixelated solution, where one or more formation parameter values at a particular true vertical depth (TVD) or a range of TVDs is represented as pixels and displayed on a display screen. As yet another example, a statistical analysis, such as P5, P50, or P95, standard deviations, and/or a mean may be calculated for the formation properties. As another example, a model of the geological formation may be generated and/or displayed. Other variations are also possible.

Figure 7:
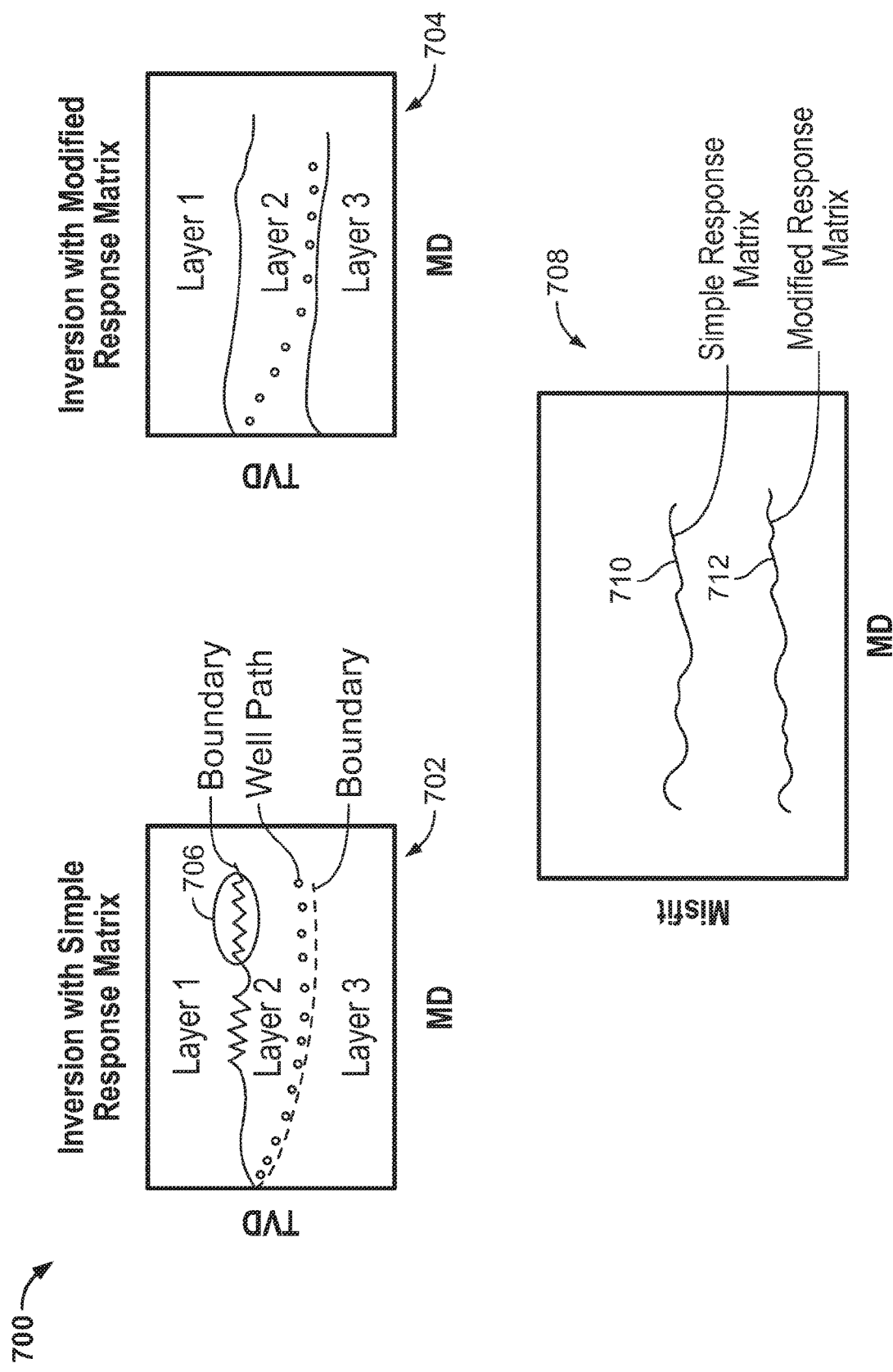
FIG. 7 is a plot which compares results of the inversion process based on the simple response matrix and results of the inversion process based on the modified response matrix.

FIG. 7 shows plots 700 of inversion results 702 as a function of true vertical depth (TVD) and measured depth (MD) using the simple response matrix and inversion results 704 as a function of TVD and MD using the modified response matrix. The inversion results include characteristics of formation boundaries between layers of the formation. Additionally, a well path associated with drilling a well with respect to the formation layers is shown with the inversion results. The inversion results 702 show that use of the simple response matrix during the inversion produces undulations 706 along a formation boundary which is geologically not likely. The inversion results 704 show that use of the modified response matrix as shown in FIG. 6 results in smoother formation boundaries during the inversion which is more geologically likely. In this regard, inversion results 704 are a better indicator of actual formation properties in the geological formation. Accuracy of the inversion results 704 is confirmed by a misfit plot 708. Curve 710 indicates misfit between a simulated simple response matrix and simple response matrix during the inversion process (e.g., comparison at step 608 in FIG. 6) while curve 712 indicates misfit between a simulated modified response matrix and modified response matrix during the inversion process. The misfit is higher for the simple response matrix compared to the modified response matrix, indicating that use of the modified response matrix generates more accurate inversion results.

Referring back to FIG. 3, at 314, the formation properties are output. The output may take the form of displaying the formation properties on a display screen of a computer located on the surface to facilitate geosteering by a drill operator, among other purposes. Geosteering is an intentional control to adjust drilling direction of a drill bit to reach hydrocarbon deposits. The resistivity at layers may be indicative of oil, gas, and oil water contact ahead of the drill bit. The drill bit may be steered based on these indications to maximize hydrocarbon production in the subsurface formation. For example, if the resistivity ahead of the bit indicates presence of hydrocarbons, then the drill bit may be steered in that direction while if the resistivity ahead of the bit indicates presence of water, then the drill bit may be steered in another direction.

The modified response matrix results in an optimal inversion of formation properties for depths within a half of a spacing or less between a transmitter and receiver pair. For depths greater than a half of a spacing between the transmitter and receiver pair, the simple response matrix results in an optimal inversion of formation properties. In this regard, use of the simple response matrix and modified response matrix may be combined in the inversion process to determine formation properties of a formation.

Figure 8:
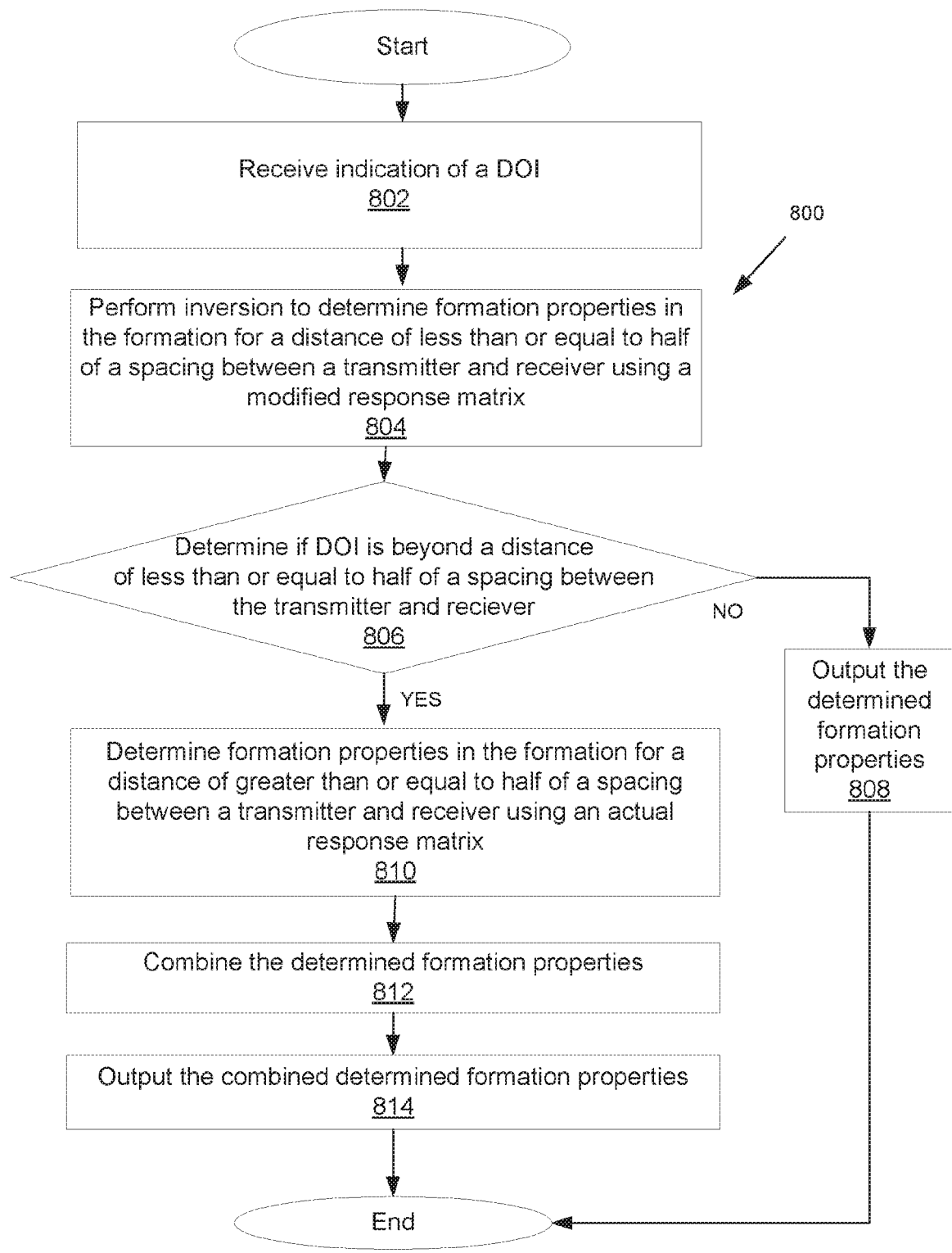
FIG. 8 is a flow chart of functions associated with determining formation properties of the geological formation based on the simple response matrix and modified response matrix.

FIG. 8 is a flow chart 800 of functions associated with determining formation properties of a formation based on both the simple response matrix and modified response matrix. The flow chart 800 may be executed by the structure described with respect to FIGS. 1-2 including one or more of the control system, inversion system, and downhole tool.

At 802, an indication of a depth of investigation (DOI) may be received. The DOI may define distance from the tool into the geological formation for which formation properties is to be determined. The DOI may range from as little as 1 inch to as much as 200 feet in some examples. The DOI may be indicated in many ways including via user input or a parameter stored in memory. At 804, an inversion is performed to determine formation properties in the formation for a distance of less than or equal to half of a spacing between the transmitter and receiver using the modified response matrix as an input to the inversion. At 806, a determination is made if the DOI is beyond half of a spacing between the transmitter and receiver. If the DOI is less than half of the spacing between the transmitter and receiver, then the process may end with the formation properties 808 that are determined for the DOI. If the DOI is greater than half of the spacing between the transmitter and receiver, then at 810, an inversion is performed to determine formation properties greater than half of the spacing between the transmitter and receiver based on the simple response matrix as an input into the inversion. At 812, inversion results determined at 804 and 810 are combined to determine formation properties within the half of the transmitter and receiver spacing and outside of the half of the transmitter and receiver spacing respectively. In this regard, the modified response matrix and simple response matrix may be used to determine formation properties in certain regions of the formation with respect to the DOI (e.g., the modified response matrix for formation properties at a DOI located less than half of the spacing between the transmitter and receiver and the simple response matrix for greater distances). At 814, the combined determined formation properties are output, e.g., for geosteering purposes among others.

Figure 9:
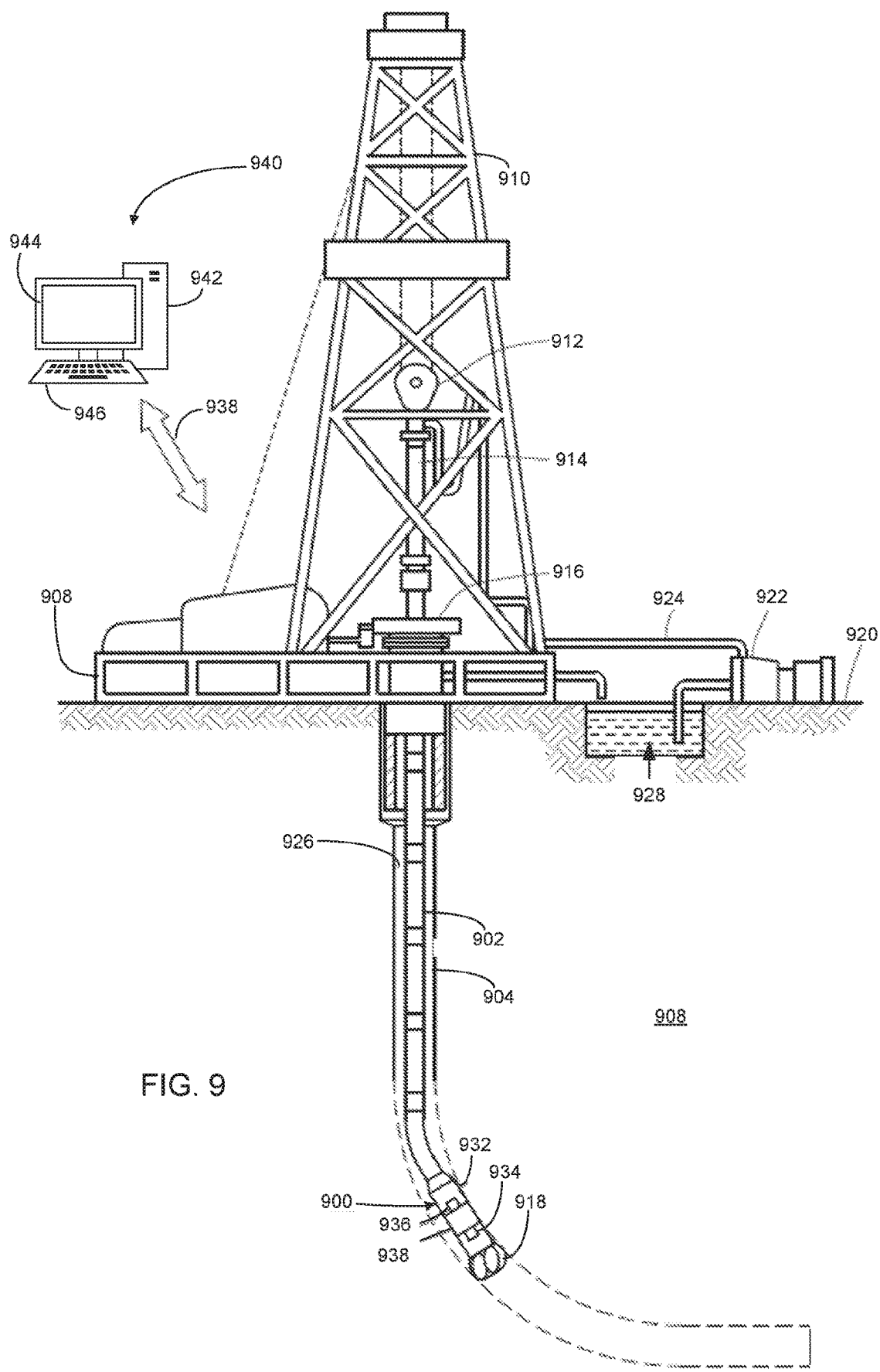
FIG. 9 is a schematic diagram of a wellbore sampling and analysis system in accordance with one or more embodiments.

FIG. 9 is a schematic diagram of well apparatus 900 in which above the functions may be performed. The well apparatus 900 includes a drill bit 902 disposed on a drill string 904 of the well apparatus 900 for drilling a wellbore 906 in a subsurface formation 908. While wellbore 906 is shown extending generally vertically into the subsurface formation 908, the principles described herein are also applicable to wellbores that extend at an angle through the subsurface formation 908, such as horizontal and slanted wellbores. For example, the wellbore can be angled vertically followed by a low inclination angle, high inclination angle or horizontal placement of the well. It should further be noted that a land-based operation is depicted, but those skilled in the art will readily recognize that the principles described herein are equally applicable to subsea operations that employ floating or sea-based platforms and rigs, without departing from the scope of the disclosure.

The well apparatus 900 may further includes a drilling platform 910 that supports a derrick 912 having a traveling block 914 for raising and lowering drill string 904. Drill string 904 may include, but is not limited to, drill pipe and coiled tubing, as generally known to those skilled in the art. A kelly 916 may support drill string 904 as it may be lowered through a rotary table 918. The drill bit 902 may crush or cut rock, be attached to the distal end of drill string 904 and be driven either be a downhole motor and/or via rotation of drill string 904 from the surface 920. Without limitation, drill bit 902 may include, roller cone bits, PDC bits, natural diamond bits, any hole openers, reamers, coring bits, and the like. As drill bit 902 rotates, it may create and extend wellbore 906 that penetrates various subterranean formations. A pump 922 may circulate drilling fluid through a feed pipe 924 to kelly 916, downhole through interior of drill string 904, through orifices in drill bit 902, back to surface 920 via annulus 926 surrounding drill string 904, and into a retention pit 928.

Drill bit 902 may be just one piece of the drill string 904 that may include one or more drill collars 930 and one or more sampling tools 932. The sampling tool 932 may contain one or a plurality of logging tools 934 such as logging-while-drilling (LWD) or measuring-while-drilling (MWD) tools for measuring, processing, and storing information. It will also be understood that more than one sampling tool 932, e.g., downhole tool, (i.e., one or more LWD and/or MWD module) can be employed. Sampling tool 932 may be arranged to communicate with a computing system 936. Computing system 936 may include a processing system 938, a monitor 940, an input device 942 (e.g., keyboard, mouse, etc.), and/or computer media (e.g., optical disks, magnetic disks) that can store code to determine formation properties in the subsurface formation 908 as described herein. Computing system 936 may act as a data acquisition system and possibly a data processing system that analyzes information from sampling tool 932. Any suitable technique may be used for transmitting signals from sampling tool 932 to the computing system 936 residing on the surface 920. As illustrated, a communication link 944 (which may be wired or wireless, for example) may be provided that may transmit data from sampling tool 932 to the computing system 936. Communication link 944 may implement one or more of various known drilling telemetry techniques such as mud-pulse, acoustic, electromagnetic, etc.

Figure 10:
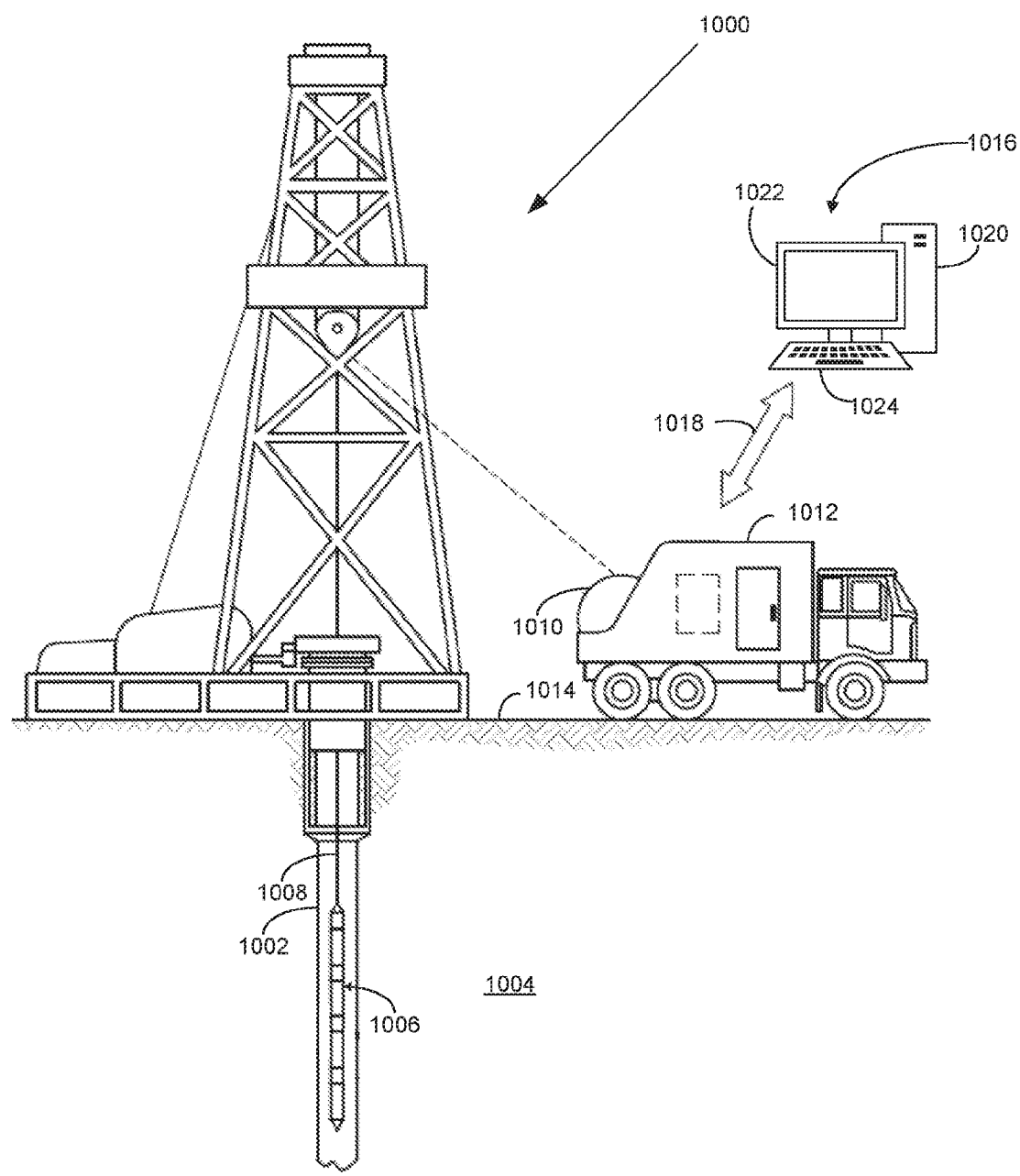
FIG. 10 is a schematic diagram of an example downhole fluid sampling and analysis tool on a wireline in accordance with one or more embodiments.

FIG. 10 is a schematic diagram of another well apparatus 1000 in which the above functions may be performed. A wellbore 1002 may extend through subterranean formation 1004. Downhole sampling tool 1006 may be similar in configuration and operation to downhole sampling tool 932 shown on FIG. 9 except that FIG. 10 shows sampling tool 1004 disposed on wireline 1008. It should be noted that while FIG. 10 generally depicts a land-based drilling system, those skilled in the art will readily recognize that the principles described herein are equally applicable to subsea drilling operations that employ floating or sea-based platforms and rigs, without departing from the scope of the disclosure.

As illustrated, a hoist 1010 may be used to run sampling tool 1006 into wellbore 1002. Hoist 1010 may be disposed on a recovery vehicle 1012. Hoist 1010 may be used, for example, to raise and lower wireline 1008 in wellbore 1002. While hoist 1010 is shown on recovery vehicle 1012, it should be understood that wireline 1008 may alternatively be disposed from a hoist 1010 that is installed at surface 1014 instead of being located on recovery vehicle 1012. Sampling tool 1006 may be suspended in wellbore 1002 on wireline 1008. Other conveyance types may be used for conveying sampling tool 1008 into wellbore 1002, including coiled tubing, wired drill pipe, slickline, and downhole tractor, for example. Sampling tool 1006 may contain one or a plurality of logging tools for measuring, processing, and storing information associated with the formation around the sampling tool and ahead of the sampling tool.

As previously described, information from sampling tool 1006 may be transmitted to a computing system 1016, which may be located at surface 1014. As illustrated, communication link 1018 (which may be wired or wireless, for example) may be provided that may transmit data from sampling tool 1006 to an information handling system 1016 at surface 1014. Information handling system 1016 may include a processing system 1020, a monitor 1022, an input device 1024 (e.g., keyboard, mouse, etc.), and/or computer media (e.g., optical disks, magnetic disks) that can store code for determining formation properties of the subterranean foundation 1004 as described herein. In addition to, or in place of processing at surface 1014, processing may occur downhole.

Figure 11:
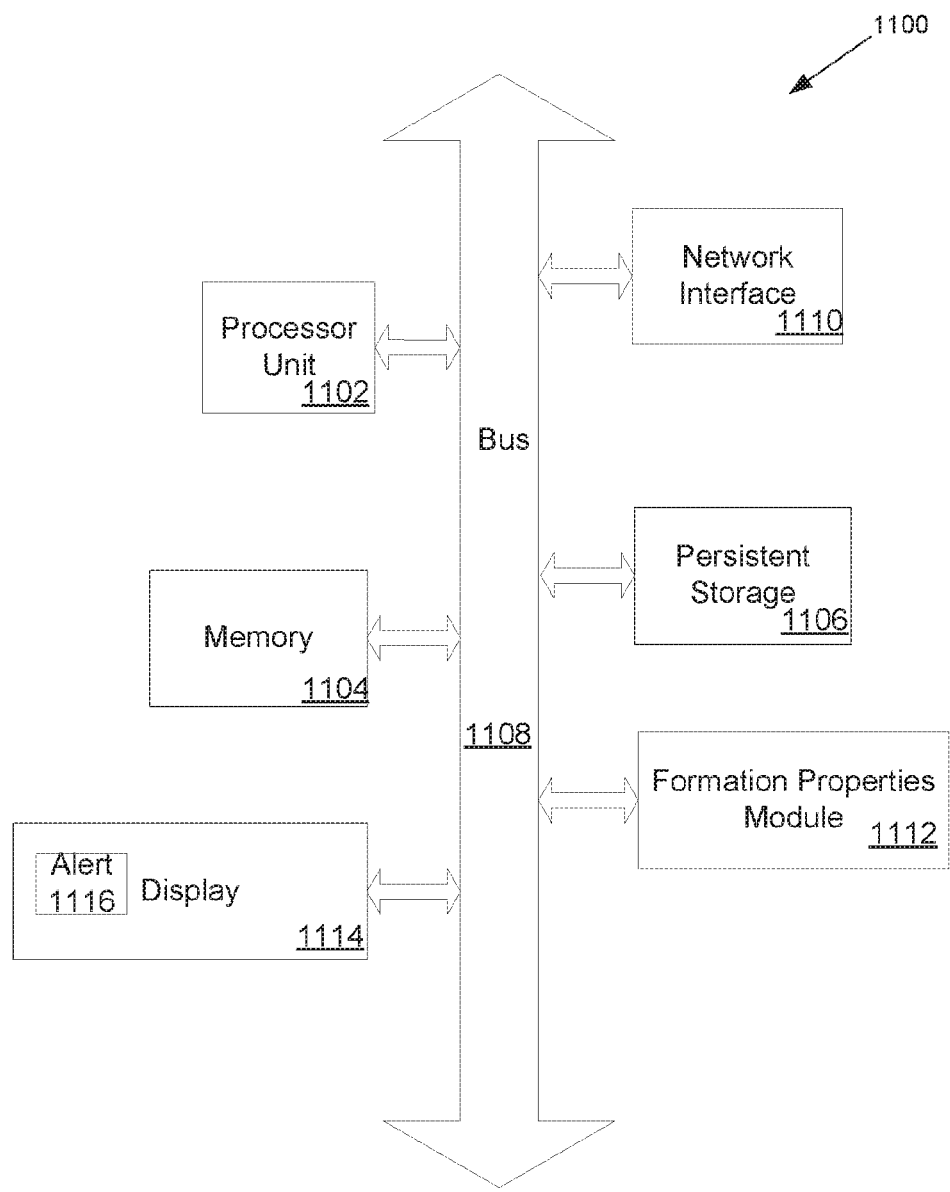
FIG. 11 shows an example computer system, according to some embodiments.

FIG. 11 is a block diagram of apparatus 1100 (e.g., the inversion system and/or control system) such as a computer system for determining formation properties. The apparatus 1100 may be located at a surface of a formation or downhole. In the case that the apparatus 1100 is downhole, the apparatus 1100 may be rugged, unobtrusive, can withstand the temperatures and pressures in situ at the wellbore.

The apparatus 1100 includes a processor 1102 (possibly including multiple processors, multiple cores, multiple nodes, and/or implementing multi-threading, etc.). The apparatus 1100 includes memory 1104. The memory 1104 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The apparatus 1100 may also include a persistent data storage 1106. The persistent data storage 1106 can be a hard disk drive, such as magnetic storage device. The computer device also includes a bus 1108 (e.g., PCI, ISA, PCI-Express, HyperTransport® bus, InfiniBand® bus, NuBus, etc.) and a network interface 1110 in communication with a sensor tool. The apparatus 1100 may have a formation properties system 1112 which includes hardware and/or software to determine formation properties in a formation as described above. The hardware and/or software may include the control system and inversion system.

Further, the apparatus 1100 may further comprise a display 1114. The display 1114 may comprise a computer screen or other visual device. The display 1114 may show the formation properties determined by the formation properties module 1112. Additionally, the display 1114 may convey alerts 1116. The formation processing module 1112 may generate the alerts 1116 relating to formation properties that may be rendered on the display 1114 such as the drill bit approaching a gas or oil formation. The alerts 1116 may be visual in nature but they may also comprise audible alerts output by an audio output device (e.g., speaker). In some examples, a user interacts with the apparatus 1100 via one or more input devices and the display 1114. In some system embodiments, a driller employs the apparatus 1100 to make geosteering decisions (e.g., modifying the borehole trajectory or steering the drill bit 14) and communicate appropriate commands to the bottom-hole assembly to execute those decisions based on the formation properties.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 302-312 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module", "system", or "system." The functionality presented as individual modules/systems in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any non-transitory tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a earlier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for formation properties ahead of a drill bit as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: inserting a downhole tool into a borehole of a geological formation, the downhole tool comprising a transmitter and a receiver; transmitting, by the transmitter, a first signal; receiving, by the receiver, a second signal, wherein the second signal is induced by the first signal in the geological formation; determining a simple response matrix based on the second signal, wherein the simple response matrix includes a plurality of response components; linearly combining one or more of the response components; forming a modified response matrix by replacing one or more of the plurality of response components in the simple response matrix with the linear combination; inverting the modified response matrix; and outputting an indication of formation properties in the geological formation based on the inversion.

Embodiment 2: The method of Embodiment 1, wherein the one or more of the plurality of response components in the simple response matrix is a first one or more of the plurality of response components; and wherein forming the modified response matrix further comprises setting a second one or more of the plurality of response components in the simple response matrix to a fixed value.

Embodiment 3: The method of Embodiment 1 or 2, wherein the fixed value is zero.

Embodiment 4: The method of any of Embodiments 1-3, wherein the geological formation is represented as formation layers arranged vertically.

Embodiment 5: The method of any of Embodiments 1-4, wherein the plurality of responses components in the simple response matrix is represented as:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

wherein $V_{ij}$ indicates a magnitude of the second signal received by the receiver, when oriented in a direction "j", as a result of the transmitter, when oriented in a direction "i", transmitting the first signal, where i and j indicate one of an x, y, or z direction of a tool coordinate system.

Embodiment 6: The method of any of Embodiments 1-5, wherein the linear combination associated with Vxz and Vzx in the modified response matrix is −Vxx −Vxz +Vzx −Vz and −Vxx +Vxz −Vzx −Vzz respectively.

Embodiment 7: The method of any of Embodiments 1-6, wherein inverting the modified response matrix comprises inverting the modified response matrix to determine first formation properties of the geological formation within a depth of investigation less than or equal to one half of a distance between the transmitter and receiver and inverting the simple response matrix to determine second formation properties of the geological formation within a depth of investigation greater than one half of the distance.

Embodiment 8: The method of any of Embodiments 1-7, further comprising geosteering, a drill bit based on the formation properties to extract hydrocarbon from the geological formation.

Embodiment 9: The method of any of Embodiments 1-8, wherein the formation properties include a resistivity of the geological formation.

Embodiment 10: A system comprising: a downhole tool inserted in a borehole of a geological formation, the downhole tool having a transmitter and a receiver, the transmitter transmits a first signal and the receiver receives a second signal, wherein the second signal is induced by the first signal in the geological formation; a processor; and a machine-readable medium having program code executable by the processor to cause the processor to: determine a simple response matrix based on the second signal, wherein the simple response matrix includes a plurality of response components; linearly combine one or more of the response components; form a modified response matrix by replacing one or more of the plurality of response components in the simple response matrix with the linear combination; invert the modified response matrix; and output an indication of formation properties in geological formation based on the inversion.

Embodiment 11: The system of Embodiment 10, wherein the one or more of the plurality of response components in the simple response matrix is a first one or more of the plurality of response components; and wherein the program code to form the modified response matrix further comprises program code to set a second one or more of the plurality of response components in the simple response matrix to a fixed value.

Embodiment 12: The system of any of Embodiment 10 or 11, wherein the fixed value is zero.

Embodiment 13: The system of any of Embodiments 10-12, wherein the geological formation is represented as formation layers arranged vertically.

Embodiment 14: The system of any of Embodiments 10-13, wherein the plurality of responses components in the simple response matrix is represented as:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

wherein $V_{ij}$ indicates a magnitude of the second signal received by the receiver, when oriented in a direction "j", as a result of the transmitter, when oriented in a direction "i", transmitting the first signal, where i and j indicate one of an x, y, or z direction of a tool coordinate system; and wherein the linear combination associated with Vxz and Vzx in the modified response matrix is −Vxx −Vxz +Vzx +Vz and −Vxx +Vxz −Vzx +Vzz respectively.

Embodiment 15: The system of any of Embodiments 10-14, wherein the linear combination associated with Vxz and Vzx in the modified response matrix is −Vxx −Vxz +Vzx +Vz and −Vxx +Vxz −Vzx +Vzz respectively.

Embodiment 16: The system of any of Embodiments 10-15, wherein the program code to invert the modified response matrix comprises program code to invert the modified response matrix to determine first formation properties of the geological formation within a depth of investigation less than or equal to one half of a distance between the transmitter and receiver and program code to invert the simple response matrix to determine second formation properties of the geological formation within a depth of investigation greater than one half of a distance.

Embodiment 17: The system of any of Embodiments 10-16, further comprising program code to geosteer a drill bit based on the formation properties to extract hydrocarbon from the geological formation.

Embodiment 18: One or more non-transitory machine-readable media comprising program code, the program code to: transmit, by a transmitter of a downhole tool inserted in a borehole of a geological formation, a first signal; receive, by a receiver of the downhole tool, a second signal, wherein the second signal is induced by the first signal in the geological formation; determine a simple response matrix based on the second signal, wherein the simple response matrix includes a plurality of response components; linearly combine one or more of the response components; form a modified response matrix by replacing one or more of the plurality of response components in the simple response matrix with the linear combination; invert the modified response matrix; and output an indication of formation properties in geological formation based on the inversion.

Embodiment 19: One or more non-transitory machine-readable media of Embodiment 18 comprising program code, wherein the plurality of response components associated with the simple response matrix is represented as:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

wherein $V_{ij}$ indicates a magnitude of the second signal received by the receiver, when oriented in a direction "j", as a result of the transmitter, when oriented in a direction "i", transmitting the first signal, where i and j indicate one of an x, y, or z direction of a tool coordinate system; and wherein the linear combination associated with Vxz and Vzx in the modified response matrix is −Vxx −Vxz +Vzx +Vz and −Vxx +Vxz −Vzx +Vzz respectively.

Embodiment 20: One or more non-transitory machine-readable media of Embodiment 18 or 19, wherein the one or more of the plurality of response components in the simple response matrix is a first one or more of the plurality of response components; and wherein the program code to form the modified response matrix further comprises program code to set a second one or more of the plurality of response components in the simple response matrix to a fixed value.

What is claimed is:
1. A method comprising:
  inserting a downhole tool into a borehole of a geological formation, the downhole tool comprising a transmitter and a receiver;
  transmitting, by the transmitter, a first signal;
  receiving, by the receiver, a second signal, wherein the second signal is induced by the first signal in the geological formation;
  determining a simple response matrix based on the second signal, wherein the simple response matrix includes a plurality of response components, and wherein the plurality of response components includes a plurality of cross components;

linearly combining one or more of the plurality of cross components with one or more of the plurality of response components to generate a plurality of linear combinations;

forming a modified response matrix by replacing the one or more of the plurality of cross components in the simple response matrix with the plurality of linear combinations;

inverting the modified response matrix; and outputting an indication of formation properties in the geological formation based on the inversion.

2. The method of claim 1, wherein the one or more of the plurality of response components in the simple response matrix is a first plurality of response components, and wherein forming the modified response matrix further comprises setting the first plurality of response components in the simple response matrix to a fixed value.

3. The method of claim 2, wherein the fixed value is zero.

4. The method of claim 1, wherein the geological formation is represented as formation layers arranged vertically.

5. The method of claim 1, wherein the plurality of response components in the simple response matrix is represented as:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

wherein $V_{ij}$ indicates one or more properties of the second signal received by the receiver oriented in a direction "j", as a result of the transmitter oriented in a direction "i" transmitting the first signal, where i and j indicate one of an x, y, or z direction of a tool coordinate system.

6. The method of claim 5, wherein the plurality of linear combinations associated with Vxz and Vzx in the modified response matrix is −Vxx −Vxz +Vzx +Vzz and −Vxx +Vxz −Vzx +Vzz respectively.

7. The method of claim 5, wherein the plurality of cross components comprises Vxz and Vzx.

8. The method of claim 1, wherein inverting the modified response matrix comprises inverting the modified response matrix to determine first formation properties of the geological formation within a depth of investigation less than or equal to one half of a distance between the transmitter and the receiver, and inverting the simple response matrix to determine second formation properties of the geological formation within a depth of investigation greater than one half of the distance.

9. The method of claim 1, wherein the formation properties include a resistivity of the geological formation.

10. A system comprising:
a downhole tool inserted in a borehole of a geological formation, the downhole tool having a transmitter and a receiver, the transmitter transmits a first signal and the receiver receives a second signal, wherein the second signal is induced by the first signal in the geological formation;
a processor; and
a non-transitory machine-readable medium having program code executable by the processor to cause the processor to:
determine a simple response matrix based on the second signal, wherein the simple response matrix includes a plurality of response components and wherein the plurality of response components includes a plurality of cross components;

linearly combine one or more of the plurality of cross components with one or more of the plurality of response components to generate a plurality of linear combinations;

form a modified response matrix by replacing the one or more of the plurality of cross components in the simple response matrix with the plurality of linear combinations;

invert the modified response matrix; and output an indication of formation properties in the geological formation based on the inversion.

11. The system of claim 10, wherein the one or more of the plurality of response components in the simple response matrix is a first plurality of response components, and wherein the program code to form the modified response matrix further comprises program code to set the first plurality of response components in the simple response matrix to a fixed value.

12. The system of claim 11, wherein the fixed value is zero.

13. The system of claim 10, wherein the geological formation is represented as formation layers arranged vertically.

14. The system of claim 10, wherein the plurality of response components in the simple response matrix is represented as:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

wherein $V_{ij}$ indicates one or more properties of the second signal received by the receiver oriented in a direction "j", as a result of the transmitter oriented in a direction "i" transmitting the first signal, where i and j indicate one of an x, y, or z direction of a tool coordinate system.

15. The system of claim 14, wherein the plurality of linear combinations associated with Vxz and Vzx in the modified response matrix is −Vxx −Vxz +Vzx +Vzz and −Vxx +Vxz −Vzx +Vzz respectively.

16. The system of claim 14, wherein the plurality of cross components comprises Vxz and Vzx.

17. The system of claim 10, wherein the program code to invert the modified response matrix comprises program code to invert the modified response matrix to determine first formation properties of the geological formation within a depth of investigation less than or equal to one half of a distance between the transmitter and the receiver, and program code to invert the simple response matrix to determine second formation properties of the geological formation within a depth of investigation greater than one half of the distance.

18. One or more non-transitory machine-readable media comprising program code, the program code to:
- transmit, by a transmitter of a downhole tool inserted in a borehole of a geological formation, a first signal;
- receive, by a receiver of the downhole tool, a second signal, wherein the second signal is induced by the first signal in the geological formation;
- determine a simple response matrix based on the second signal, wherein the simple response matrix includes a plurality of response components, and wherein the plurality of response components includes a plurality of cross components;
- linearly combine one or more of the plurality of cross components with one or more of the plurality of response components to generate a plurality of linear combinations;
- form a modified response matrix by replacing the one or more of the plurality of cross components in the simple response matrix with the plurality of linear combinations;
- invert the modified response matrix; and
- output an indication of formation properties in the geological formation based on the inversion.

19. The one or more non-transitory machine-readable media of claim 18, wherein the plurality of response components associated with the simple response matrix is represented as:

$$\begin{bmatrix} V_{xx} & V_{xy} & V_{xz} \\ V_{yx} & V_{yy} & V_{yz} \\ V_{zx} & V_{zy} & V_{zz} \end{bmatrix}$$

wherein $V_{ij}$ indicates one or more properties of the second signal received by the receiver oriented in a direction "j", as a result of the transmitter oriented in a direction "i" transmitting the first signal, where i and j indicate one of an x, y, or z direction of a tool coordinate system; and wherein the plurality of linear combinations associated with Vxz and Vzx in the modified response matrix is −Vxx −Vxz +Vzx +Vzz and −Vxx +Vxz −Vzx +Vzz respectively.

20. The one or more non-transitory machine-readable media of claim 18, wherein the one or more of the plurality of response components in the simple response matrix is a first plurality of response components, and wherein the program code to form the modified response matrix further comprises program code to set the first plurality of response components in the simple response matrix to a fixed value.

* * * * *